Oct. 14, 1941.   E. KROCHMANN   2,259,070
TELEMETERING RECEIVER
Filed Aug. 14, 1940

Inventor:
Eduard Krochmann,
by Harry E. Dunham
His Attorney.

Patented Oct. 14, 1941

2,259,070

UNITED STATES PATENT OFFICE 2,259,070

TELEMETERING RECEIVER

Eduard Krochmann, Grunau, Germany, assignor to General Electric Company, a corporation of New York Application August 14, 1940, Serial No. 352,612
In Germany June 16, 1939

3 Claims. (Cl. 177—351)

My invention relates to a telemetering system of the type in which a transmitter transmits a frequency proportional to the measurement or other signal to be transmitted, and my invention concerns primarily the receiving apparatus inclusive of means for converting the transmitting frequency into a direct current proportional to such frequency in such manner that the errors due to distortion, harmonics, damping and voltage variations of the A.—C. signal frequency are avoided.

In carrying my invention into effect, I employ a circuit containing a condenser and full wave rectifier in series, across which the received signaling frequency is impressed. In parallel with the condenser circuit is a circuit containing means for by-passing those portions of the signaling voltage wave which are in excess of a predetermined value. As a result, the condenser is charged to the predetermined value only and the charging current which is rectified is the same in every half cycle and is thus independent of the voltage and wave form of the signaling voltage. The measured direct current is, however, proportional to the frequency.

Figure 2:
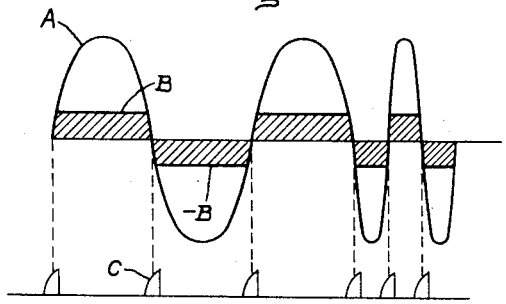
Figure 3:
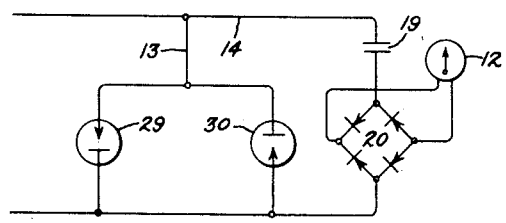

The features of my invention which are believed to be novel and patentable will be pointed out in the claims appended hereto. For a better understanding of my invention, reference is made in the following description to the accompanying drawing in which Fig. 1 is a wiring diagram of a telemetering system in which the essential features of the receiving apparatus, including my invention, are illustrated, Fig. 2 shows by means of explanatory curves the manner in which the transmitting alternating current is converted into a direct current; and Fig. 3 represents a modified form of by-pass for the receiver.

Figure 1:
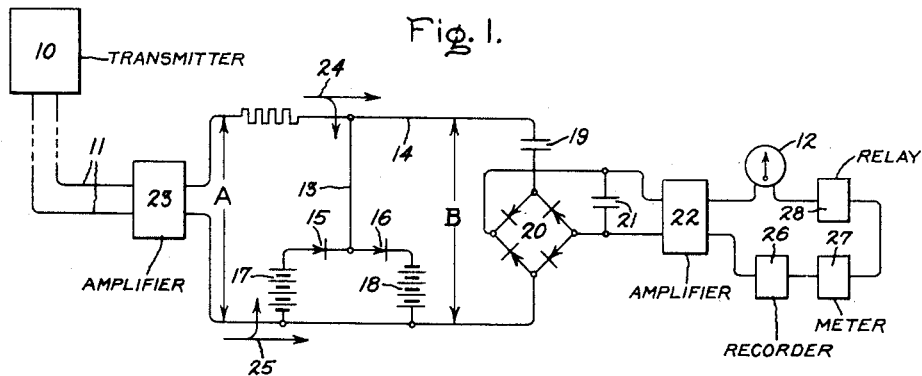

In Fig. 1, 10 represents any suitable form of transmitter which is arranged to transmit an alternating current voltage of a frequency proportional to the signal to be transmitted. Thus across the output terminals of transmitter 10 or the amplifier 23 a voltage represented by the wave A, Fig. 2, is produced. This voltage may be of substantially constant magnitude but its frequency varies as indicated in Fig. 2 where the first part of the wave represents a relatively low frequency and the latter part a relatively high frequency corresponding respectively to relatively low and relatively high measurements to be transmitted.

This frequency is transmitted over a suitable telemetering circuit 11 to the receiving apparatus having a direct current instrument 12 influenced by a direct current proportional to the frequency A transmitted from 10. At the receiving end of the line or other transmitting channel the signal may be amplified if necessary by an amplifier 23, but in any event the received signal is divided into parallel branches 13 and 14. Branch 13 has a divided portion containing reversely connected rectifiers 15 and 16 in series with voltage opposing devices 17 and 18 respectively. The voltage opposing devices may be direct current batteries or any other suitable means for opposing the flow of current in the direction permitted by the rectifier until the voltage across such battery or device exceeds a predetermined value. Thus battery 17 is connected to oppose the direct current which is permitted to pass in one direction through rectifier 15 until the rectified voltage across the battery from line 11 exceeds the opposing battery voltage which is to be maintained at a constant value. Likewise, battery 18 is connected to oppose the direct current which is permitted to pass, in the opposite direction, through rectifier 16 until the rectified voltage across the battery from line 11 exceeds the voltage of battery 18 also maintained constant and equal to that of battery 17. Current from line 11 will pass through branch 13 only when the voltage across this branch exceeds the battery voltages.

The other branch 14 is connected across line 11 through a condenser 19 and a full-wave rectifier 20. The instrument 12 is connected across the direct current terminals of the rectifier preferably with a smoothing condenser 21 and, if necessary, an amplifier represented at 22 may be connected in ahead of the instrument. It is now seen that when the A.—C. signal is received at the receiving station, it has two paths 13 and 14 in which it may flow. Let the branched arrow at 24 represent a positive half wave of such signal. The current first flows through branch 14 charging condenser 19 until the voltage across the condenser reaches the value of the bucking voltage of battery 18 in branch 13. Then the remainder of the positive half-wave flows through rectifier 16 and battery 18. The opposite half-wave represented by arrow 25 also divides, part going through branch 14 until condenser 19 is charged in the opposite direction to the voltage of battery 17, and the remainder is then by-passed through battery 17 and rectifier 15 in branch 13. In Fig. 2 the lines B and —B represent the voltages to which condenser 19 is charged by the positive and negative signal waves. The excess voltage of the signal wave A which exceeds the voltages B and —B is diverted through branch 13. The square wave constant magnitude A.—C. voltage B—B impressed across condenser 19 is independent of the magnitude of the signal wave voltage and of its wave form. The only precaution necessary is to see that the magnitude of the received A.—C. signal voltage always exceeds the value B and this is easily accomplished.

Below curves A and B—B in Fig. 2 I have represented at C the rectified current impulses which flow through rectifier 20 and the circuit of instrument 12 incident to the charging and discharging of condenser 19. It is apparent that these current impulses will be of constant magnitude and will occur every half cycle, hence the amount of such rectified current flowing in a given period of time is proportional to the frequency. This current may be smoothed out by the condenser 21, amplified if necessary, and caused to operate a suitably damped direct current indicating instrument 12. Other direct current devices may also be operated by this current. For example, the device indicated at 26 may be a recording instrument, the device at 27 an integrating meter and the device at 28 a control relay.

Fig. 3 represents other rectifying and voltage responsive discharge apparatus in the branch circuit 13 that may be employed consisting of reversely connected glow tubes 29 and 30. A glow tube is a form of rectifier that breaks down to pass current only at a predetermined voltage. Thus the glow tube 29 of Fig. 3 performs substantially the functions of rectifier 15 and battery 17 of Fig. 1.

The fact that such a glow tube may have a lower interrupting voltage than its break down voltage appears to be immaterial since the condenser 19 will be charged to the constant break down voltage of such tubes twice per cycle in opposite directions, although it may discharge partially through both tubes.

The receiving apparatus described contains no moving contact devices and will operate equally well with a sine wave, A.—C. voltage or with sharp A.—C. voltage impulses that might be produced by a contact form of transmitter.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a system in which an alternating current varies in frequency, receiving apparatus for producing a direct current proportional to such variation in frequency comprising a condenser connected in series with a full wave rectifier and means for by-passing current around the condenser and rectifier only after the condenser has been charged to a predetermined voltage by each half-wave of the current.

2. A network which is responsive to the frequency and non-responsive to the wave form and the magnitude of an alternating current comprising a condenser circuit including a full wave rectifier connected across the received signaling voltage, means connected in parallel with said condenser circuit for limiting the voltage charge in either direction on said condenser to a predetermined value less than the maximum value of the received signaling voltage and direct current responsive means connected across the direct current terminals of said full wave rectifier.

3. A receiver for a frequency varying alternating current comprising a circuit including a condenser and a full wave rectifier in series, a pair of circuits each including a direct current voltage source and a rectifier with the rectifier connected to pass current in a direction to oppose the direct current source, means for connecting all of said circuits in parallel across the received voltage with said pair of circuits connected in reverse relation, said direct current sources being of lower voltage than the received voltage whereby said pair of circuits act as a by-pass for the condenser circuit when the condenser is charged to the voltage of said direct current sources by the received voltage and direct current responsive means connected across the direct current terminals of said full wave rectifier.

EDUARD KROCHMANN.